United States Patent

Esposito

[15] 3,682,523

[45] Aug. 8, 1972

[54] VEHICLE STORING MEANS

[72] Inventor: John Esposito, New York, N.Y.

[73] Assignee: Park-a-Bike Corp., New York, N.Y.

[22] Filed: Nov. 13, 1970

[21] Appl. No.: 89,311

[52] U.S. Cl..................................312/198, 211/23
[51] Int. Cl.......A47b 53/00, A47b 77/00, A47f 7/04
[58] Field of Search......................312/198–200, 135; 211/174

[56] References Cited

UNITED STATES PATENTS

| 706,718 | 8/1902 | Bradbury | 211/22 |
| 661,677 | 11/1900 | Taylor | 211/22 |
| 3,142,522 | 7/1964 | Hall et al. | 312/199 |
| 668,259 | 2/1901 | Krimmery | 312/135 |

FOREIGN PATENTS OR APPLICATIONS

| 642,643 | 8/1928 | France | 211/23 |
| 7,465 | 3/1897 | Great Britain | 211/18 |
| 453,284 | 6/1913 | France | 312/138 |
| 6,501,477 | 8/1966 | Netherlands | 211/22 |

*Primary Examiner*—Paul R. Gilliam
*Attorney*—Arthur O. Klein

[57] ABSTRACT

Vehicle storing means for storing and garaging vehicles in particular bicycles. The storing means comprises a base and a housing mounted thereon. The housing includes wall means dividing it into several compartments. Each compartment includes a door having coin-lock means which provide access to the compartment upon the insertion of a predetermined number of coins into said coin-lock means. Within each one of these compartments there is provided bicycle support means in the form of a continuous wheel-receiving trough member adapted to support the bicycle in an inclined or vertical parked position. An upper wheel clamping means is provided for each trough member to retain the bicycle in parked position.

6 Claims, 6 Drawing Figures

PATENTED AUG 8 1972 3,682,523

INVENTOR:
JOHN ESPOSITO
BY: Arthur O. Klein
ATTORNEY

INVENTOR:
JOHN ESPOSITO
BY:
ATTORNEY

VEHICLE STORING MEANS

BACKGROUND OF THE INVENTION

The use of bicycles is continuously increasing because they provide an inexpensive mode of transportation, do not cause any pollution, do not require large parking spaces, do not create traffic congestion etc. However, the increased use of bicycles by the public have brought about certain problems. For example, particularly in the large metropolitan areas, the extensive use of bicycles in municipal parks has created a parking problem in those parks. Furthermore, a large number of thefts of bicycles have been recorded in the metropolitan areas.

SUMMARY OF THE INVENTION

It is accordingly a primary object of the present invention to provide a construction for storing bicycles.

In particular it is an object of the invention to provide bicycle storage means which are compact and secure the bicycle against loss by theft.

In particular it is an object of the invention to provide a construction for storing bicycles which include coin-lock means, thereby providing a source of income for the municipal authority which bears the cost of construction and installation of the bicycle storing means.

In accordance with the present invention this object is achieved by providing a kiosk-like construction, preferably of octagonal shape, for storing, for example, eight bicycles. This construction comprises eight compartments, each of which is provided with a door for inserting a bicycle. Each door is provided with coin-lock means, so that the person wishing to avail itself of the bicycle storage means can obtain access to a compartment by inserting a predetermined number of coins into the coin-locking means.

Furthermore, the kiosk-like construction makes it possible to provide space for affixing advertising literature on the exterior wall surfaces of the construction thereby providing additional revenue to the municipal authority.

BRIEF DESCRIPTION OF DRAWINGS

The invention is illustrated by way of example in the accompanying drawings which form part of this application and in which.

PREFERRED EMBODIMENT OF THE INVENTION

Figure 1:
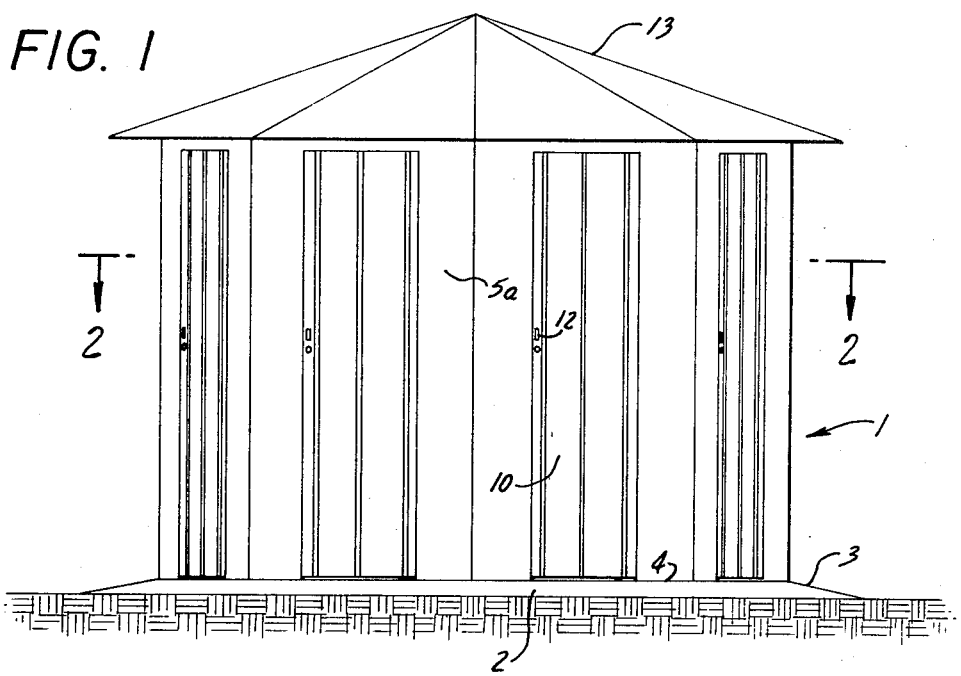
FIG. 1 is a side elevational view of the bicycle storage means in accordance with this invention.
Figure 2:
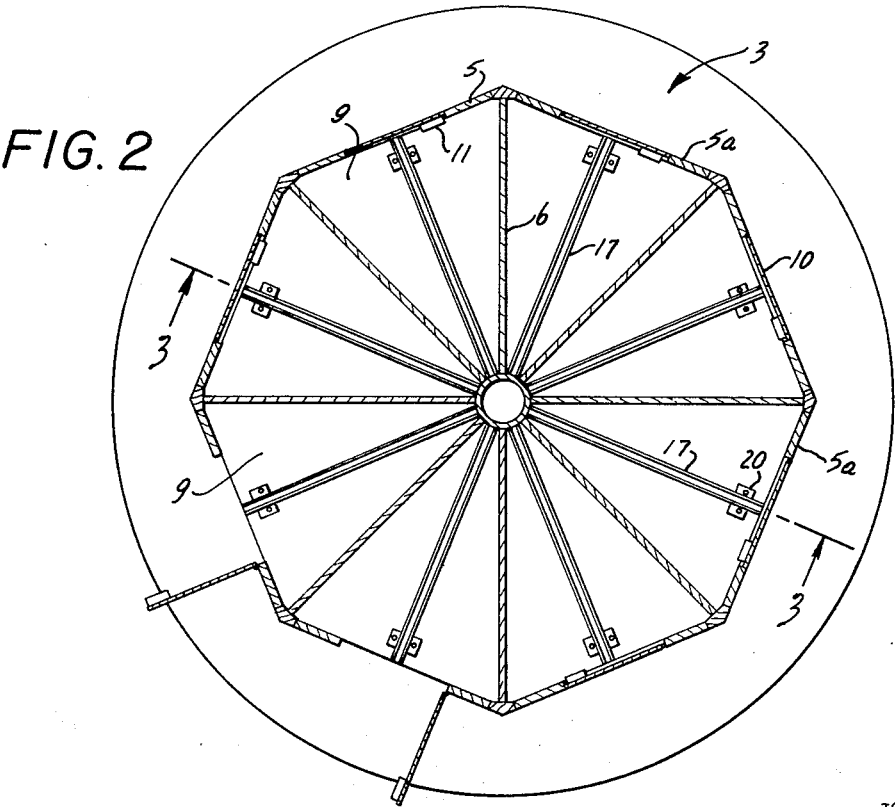
FIG. 2 is a sectional plan view of the construction shown in FIG. 1 along line 2—2 thereof.
Figure 3:
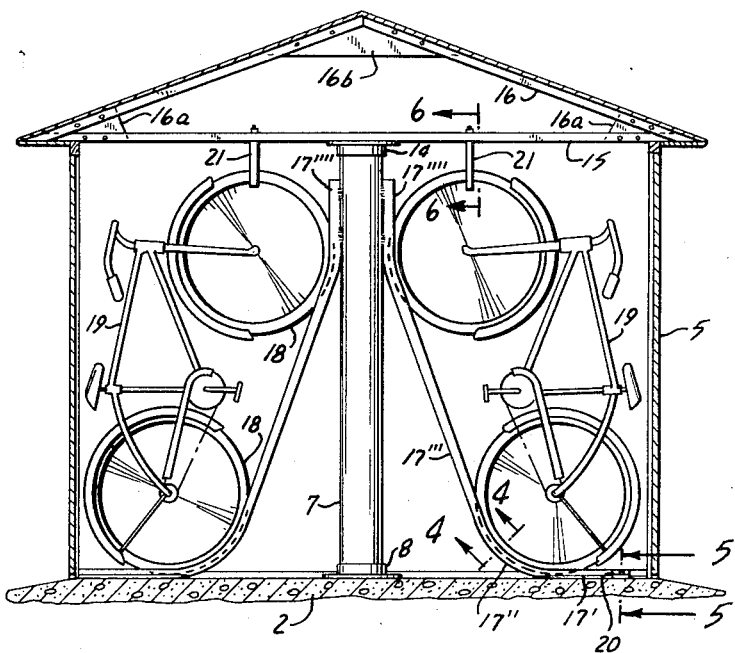
FIG. 3 is a sectional elevational view along line 3—3 of FIG. 2 showing a pair of bicycles being stored in the storage means of the invention.
Figure 4:
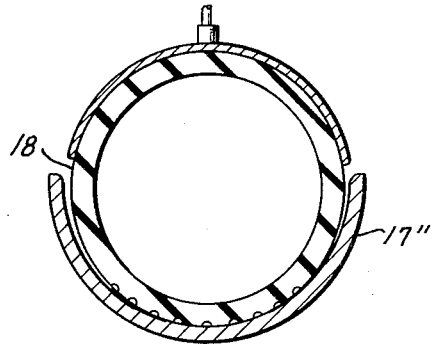
FIG. 4 is a sectional detailed view along line 4—4 of FIG. 3.
Figure 6:
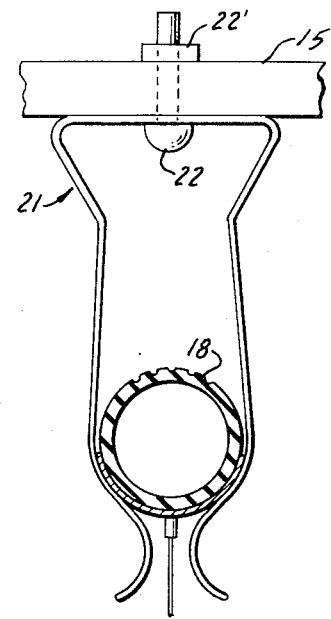
FIG. 6 is a sectional detailed view along line 6—6 of FIG. 3.
Figure 5:
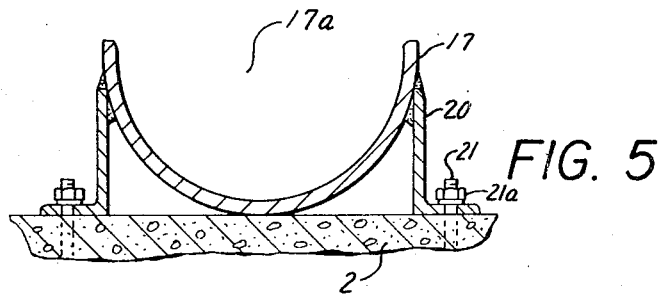
FIG. 5 is a sectional detailed view along line 5—5 of FIG. 3.

Referring now to the drawings, in particular to FIG. 1, there is illustrated a bicycle storage construction, generally referred to with the reference numeral 1. This construction comprises a concrete pad or base 2 having a slightly upwardly inclined revetment 3 leading to a horizontal concrete surface 4. As can be noted from FIG. 2 of the drawing the concrete pad is circular in shape, whereas the horizontal surface 4 is octagonal in shape. An octagonal housing 5 is mounted on the concrete pad 2. This housing 5 made of any suitable material, such as for example, anodized aluminum, corrosion resistant corrugated steel. The vertical walls of the octagonal housing 5 may be directly embedded in the concrete pad 2 or may be mounted thereon by suitable connecting means, such as for example, angles (not illustrated) affixed to the walls and to the concrete surface by means of bolts (not illustrated). The octagonal housing 5 is divided into eight compartments by means of eight vertical interior walls 6, also made of a suitable sheet material such as, for example, anodized aluminum or corrugated corrosion resistant steel. There is centrally mounted on the concrete pad 2 a vertical column 7 having a flange portion 8 by means of which it can be securely fastened onto the concrete pad 2 by means of bolts (not illustrated). The vertical walls 6 are secured to the columns 7 along their vertical interior edges and form jointly with the exterior walls 5a eight separate compartments 9. Each one of the exterior walls 5a has an opening sufficiently large to permit the passage of an adult person and the bicycle into the compartment 9. This opening is adapted to be closed by means of a door 10 suspended by conventional hinge means on the wall 5a. Each door 10 is provided with conventional coin-locking means which are adapted to lock the door 10 and release it upon the insertion of a predetermined number of coins into a slot 12. The octagonal structure is covered by a roof 13, also octagonal in shape. Thus it can be noted from FIG. 3, the column 7 supports four angle beams 15 to which there are secured eight angle beams 16 by means of plates and bolts 16a. The eight angle beams 16 meet the apex of the roof and are connected to each other by means of plates 16b. There is provided in each compartment 9 a guide channel or trough member 17 defining a guide groove 17a adapted to accommodate the tires 18 of a bicycle 19. The guide channel 17 is substantially of semicircular configuration and is secured to the level surface 4 by means of a first pair of angles 20 welded to the guide channel 17 at the upper end of their vertical legs secured to the concrete pad 2 by means of bolts 21 extending through suitable openings in the angles 20 and secured by means of nuts 21a. The bolts 21 are imbedded in the concrete pad 2. As can be noted from FIG. 3 the pairs of angles 20 are mounted near the entrance to the compartments 9. The guide channel 17 comprises a horizontal portion 17' which is continued by a gradually upwardly curved portion 17'' and upwardly obliquely extending portion 17''' and finally a vertical portion 17''''. The vertical portion 17'''' is secured to the vertical column 7 by welding. There is connected to each one of the supporting angle beams 15 a pair of bicycle wheel clamping means 21 so that there is at least one clamping means provided in each compartment 9. The clamping means 21 comprises a substantially U-shaped clamp made of spring steel. The clamp is secured to the angle beam 15 by means of a bolt 22 and a nut 22a, the bolt 22 extending into a suitable opening of the beam 15. Thus the bicycle 19 is introduced into the compartment 9 by placing the front wheel thereof into the first, entering end of trough member 17 and thereafter guidingly moving the front and rear wheels in the trough member until the front wheel is clamped into the clamping means 21. The bicycle 19 is thus securely maintained in a semi-vertical position, making the whole storage means more compact and space saving.

It is to be noted that the bicycle parking arrangement of the invention does not require handling of the bicycle other than the pushing of it as by grasping the handlebars and seat, thereby obviating any contact by the operator with the wheels, sprockets, and chain of the bicycle. It should also be noted that because of the continuous trough member 17, which is inclined in its second and third portions, the thrust required to park the bicycle is only a fraction of the weight of the bicycle.

When the bicycle 19 is to be removed from the storage means 1 of the invention the predetermined number of coins are inserted into the coin-locking means 11 thereby unlocking the door 10 and permitting a person to enter into a compartment 9. Thereafter the front wheel of the bicycle 9 is manually released from the clamping means 21 and the bicycle is removed from the compartment 9.

It should be noted that in the embodiment of this invention an octagonally shaped housing has been illustrated and described. It is, of course, possible to provide for a circular or any other type of multilateral arrangement and all such modifications are meant to be included within the scope of the following claims.

It should be noted that the wall surfaces 5 of the kiosk-like housing can be used for displaying any type of advertising material which would bring about additional revenue for the municipal authority using the construction of this invention.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. A bicycle parking arrangement, comprising
   a base;
   a housing having vertical exterior wall means mounted on said base;
   a vertical column centrally mounted in said housing and supported by said base;
   vertical interior wall means disposed inside said housing and dividing it into a plurality of separate compartments;
   each compartment having an opening for manually passing a bicycle into or out of the respective compartment;
   bicycle wheel guide means in the form of an elongated upwardly open trough member operatively mounted in each compartment;
   means for supporting the trough member in a vertical plane;
   said trough member having a first, horizontal portion disposed at substantially base level and extending inwardly from an outer, wheel-entering end,
   a second, upwardly and inwardly curved portion extending from the inner end of the first portion;
   and a third upwardly inclined portion extending from the upper end of the second portion;
   and elevated clamping means disposed in the vertical plane of the trough member for engaging the upper part of the upper wheel of a bicycle disposed in inclined parked position with its wheels in the trough member, whereby to hold the inclined bicycle in the vertical plane of the trough member.

2. The bicycle parking arrangement as set forth in claim 1, wherein the clamping means is so constructed and arranged that it automatically grips the upper part of the upper wheel of the inclined bicycle as said bicycle is thrust inwardly into its parked position.

3. The bicycle parking arrangement as set forth in claim 1, wherein said clamping means comprises a spring biased U-shaped clamp adapted to be opened by the upper bicycle tire and thereafter clampingly to engage the upper part of the upper wheel of a parked bicycle.

4. The bicycle parking arrangement as set forth in claim 1, wherein the trough member has a fourth, at least substantially vertical portion extending from the upper end of the third portion of the trough member, and said clamping means is disposed somewhat above the level of the junction between the third and fourth portions of the trough member.

5. A bicycle parking arrangement as set forth in claim 1, wherein the clamping means is so disposed that it clamps the upper wheel of the bicycle while the lower wheel of the bicycle is supported on the first, entering end of the trough member and engages the second, curved portion of the trough member.

6. The bicycle parking arrangement as set forth in claim 1, wherein said housing is octagonally shaped and there are eight separate compartments being defined by said vertical interior wall means.

* * * * *